US010490989B2

(12) United States Patent  (10) Patent No.: US 10,490,989 B2
Barnett  (45) Date of Patent: Nov. 26, 2019

(54) STRUCTURED WIRING PANEL

(71) Applicant: BBY SOLUTIONS, INC., Richfield, MN (US)

(72) Inventor: David Barnett, Minneapolis, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

(21) Appl. No.: 15/968,921

(22) Filed: May 2, 2018

(65) Prior Publication Data

US 2018/0323594 A1    Nov. 8, 2018

Related U.S. Application Data

(60) Provisional application No. 62/501,379, filed on May 4, 2017.

(51) Int. Cl.
```
H02G 3/08      (2006.01)
H02G 3/16      (2006.01)
H02G 3/10      (2006.01)
H01R 13/73     (2006.01)
H02B 1/40      (2006.01)
```
(52) U.S. Cl.
CPC .............. *H02G 3/16* (2013.01); *H01R 13/73* (2013.01); *H02G 3/083* (2013.01); *H02G 3/086* (2013.01); *H02G 3/105* (2013.01); *H02B 1/40* (2013.01); *H02G 3/10* (2013.01)

(58) Field of Classification Search
CPC .......... H02G 3/16; H02G 3/083; H02G 3/086; H02G 3/105; H02G 3/10; H02G 3/22; H02G 3/30; H02G 3/32; H02G 3/08; H01R 13/73; H02B 1/40; H02B 1/26; H02B 1/30; H02B 1/305; H02B 1/48

USPC ......... 174/50, 53, 57, 520, 72 A, 68.1, 68.3; 220/3.2, 3.3, 4.02; 248/906, 49, 68.1; 361/600, 601, 641, 633; 385/134, 135
See application file for complete search history.

(56) References Cited

U.S. PATENT DOCUMENTS 5,638,256 A * 6/1997 Leach ...................... H02B 1/50
                                                        174/58
5,933,563 A * 8/1999 Schaffer ............... G02B 6/4452
                                                        174/58
(Continued)

OTHER PUBLICATIONS

"Panel Parts List", (published prior to May 4, 2016), 2 pgs.

*Primary Examiner* — Angel R Estrada
(74) *Attorney, Agent, or Firm* — Schwegman Lundberg & Woessner, P.A.

(57) ABSTRACT

A wall-mountable enclosure including a front cover, a back panel, and a plurality of side panels. A wall opening can be located on the back panel of the enclosure. The wall opening configured for routing at least one first wire between an interior of the enclosure and an exterior of the enclosure. A room opening can be located on one of the plurality of side panels. The room opening configured for routing at least one second wire between the interior of the enclosure and the exterior of the enclosure. A connector mounting bracket coupled to the back panel and located between the back panel and the front cover. A cable routing channel can be defined between the back panel and the connector mounting bracket. The connector mounting bracket can be configured to support at least one wiring interconnect for the at least one first wire.

20 Claims, 8 Drawing Sheets

(56) References Cited

U.S. PATENT DOCUMENTS

| | | | | |
|---|---|---|---|---|
| 6,362,430 | B1 * | 3/2002 | Brown | H05K 7/1449 |
| | | | | 174/101 |
| 6,953,895 | B2 * | 10/2005 | L'Henaff | H05K 5/0204 |
| | | | | 174/50 |
| 7,151,662 | B2 | 12/2006 | Tarkoff et al. | |
| 7,423,215 | B2 * | 9/2008 | Cardenas | H02G 3/121 |
| | | | | 174/480 |
| 7,589,277 | B2 * | 9/2009 | Kessler | H05K 5/0247 |
| | | | | 174/480 |
| 7,715,213 | B2 * | 5/2010 | Mendoza | H04Q 1/064 |
| | | | | 174/97 |
| 7,722,411 | B2 | 5/2010 | Merrow et al. | |
| 8,139,914 | B2 * | 3/2012 | Lee | G02B 6/4452 |
| | | | | 385/134 |
| 8,315,057 | B2 * | 11/2012 | Xu | H04Q 1/021 |
| | | | | 174/480 |
| 8,385,709 | B2 * | 2/2013 | Hawley | H05K 7/186 |
| | | | | 385/135 |
| 8,830,657 | B2 * | 9/2014 | Myers | H02G 3/125 |
| | | | | 361/633 |
| 2016/0295722 | A1 | 10/2016 | Franck et al. | |

\* cited by examiner

STRUCTURED WIRING PANEL

CLAIM OF PRIORITY

Benefit of priority is hereby claimed to U.S. Provisional Patent Application No. 62/501,379 filed May 4, 2017 and titled "Structured Wiring Panel" that is hereby respectively incorporated by reference herein in its respective entirety.

TECHNICAL FIELD

This document pertains generally, but not by way of limitation, to wiring enclosures and patch panels, such as panels for audiovisual equipment.

BACKGROUND

Installations of entertainment or building control systems, such as home audiovisual equipment installations, often include electronic equipment, such as audio receivers, streaming media players, home theater components, satellite or cable receivers, CD, DVD, or Blu-ray players to name a few. In many installations, the electronic equipment is centrally located in the building or home. For instance, the electronic equipment can be located in a family room or utility room. One or more rooms of the building or home can include electronic components, such as televisions or speakers. Various wires for connecting the electronic equipment to the electronic components can be routed throughout the building or home, such as within the walls of the building or home. To connect the wires to the electronic equipment, the wires are often routed through an opening in a wall, such as to terminate at connections and equipment located in a dedicated room (e.g., a utility room). Wires routed through the opening in the wall are often unorganized, even in a space such as a utility room, increasing the time for connection of the wires to their respective ports on the electronic equipment. Further, the appearance of the wires protruding from the opening in the wall can appear unsightly or unprofessional. Where the wires have additional length, the extra length is often spooled on the floor, in the wall, or near the electronic equipment.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, various embodiments discussed in the present document.

DETAILED DESCRIPTION

The present application relates to devices and techniques for cable management of a home or business entertainment or building control system, such as a cable management enclosure for wiring an audiovisual system. The following detailed description and examples are illustrative of the subject matter disclosed herein; however, the subject matter disclosed is not limited to the following description and examples provided. Portions and features of some embodiments may be included in, or substituted for, those of other embodiments. Embodiments set forth in the claims encompass all available equivalents of those claims.

The present inventor has recognized, among other things, that providing a cable management enclosure configured to organize and professionalize the installation of entertainment, building control, or audiovisual systems throughout a building or home can provide a system that is aesthetically attractive and easier to install. The cable management enclosure can be mounted to a wall of the home or building. The system can include a plurality of electronic components or electronic devices located throughout the building or home. The electronic components can include, but are not limited to, televisions or speakers, and the electronic devices can include, but are not limited to, audio receivers, streaming media players or servers, home theater components, satellite or cable receivers. CD, DVD. Blu-ray players, or the like. In some examples the electronic devices can be supported on an equipment rack. The cable management enclosure can be configured to organize wiring routed from one or more electronic components through the wall for easy identification after installation.

In an example, the wall-mountable enclosure can include a front cover, a back panel, and a plurality of side panels. The back panel can be wall-facing when the enclosure is in a mounted configuration. For instance, the enclosure can be mounted on a wall surface or within a wall space (e.g., in a stud cavity of the wall). A wall opening can be located on the back panel of the enclosure. The wall opening can be configured to route at least one first wire (in-wall wiring) between an interior of the enclosure and an exterior of the enclosure. For instance, the at least one first wire is routable through a stud cavity in the wall and through the wall opening on the back panel. Accordingly, the first wire is routed directly from the stud cavity and into the interior of the enclosure.

In further examples, a plurality of wall openings can be located on the back panel and along a portion of the cable routing channel. The plurality of wall openings can be arranged on the back panel to provide organization of the one or more first wires within the enclosure. For instance, the plurality of wall openings can correspond to a group of wires routed to one of the electronic components of the plurality of electronic components, or one or the electronic devices of the plurality of electronic devices, or a room of the building or home, or of a type of wiring (e.g., CAT5/CAT6, coaxial, High-Definition Multimedia Interface (HDMI), or the like).

A connector mounting bracket can be coupled to the back panel and located between the back panel and the front cover. A cable routing channel can be defined between the back panel and the connector mounting bracket. The connector mounting bracket can be configured to support at least one wiring interconnect to host respective connection terminals for the at least one first wire. The connector mounting bracket separates the wiring interconnects from the back panel at a distance. Accordingly, the routing channel can be used to route wires behind the wiring interconnect to reduce clutter within the enclosure and separate the one or more wires coupled to the wiring interconnect according to their respective wiring assignments.

In some examples, one or more wiring interconnects can be coupled to a connector block configured to support the plurality of wiring interconnects on the connector mounting bracket. A plurality of wall openings can be located to correspond to a plurality of respective connector blocks. In an example, the wiring interconnect can include at least one keystone module, a connector socket (e.g., jack), plug, or the like. In an example, the connector block includes a front row of wiring interconnects for connecting the second wire and a back row of wiring interconnects for connecting the first wire, where the first wire is routed from the wall opening and through the cable routing channel. In some instances, a plurality of wiring interconnects can be arranged in respective connector blocks based on an association of wiring assignments. For example, the association of wiring assignments can include a room of a building or house, a category of electronic device (e.g., wires communicating with an audio receiver, television, smart home controller), or other logical grouping of wires. In a further example, a divider can separate one or more wiring interconnects of the connector block corresponding to an association of wiring assignments.

A room opening can be located on at least one of the plurality of side panels. The room opening can be configured to route at least one second wire between an interior of the enclosure and an exterior of the enclosure (e.g., between the enclosure and one or more electronic devices). In an example, the wiring interconnect can include a first terminal and a second terminal. The first terminal can be communicatively coupled to the second terminal. The first wire can be coupled to the first terminal and the second wire can be coupled to the second terminal. The electronic device can be communicatively coupled to the second wire and the second wire can be communicatively coupled to the electronic component through the first wire. Accordingly, the enclosure can provide a logical way to organize a large number of wires (e.g., first wires and second wires) within the enclosure. In some examples, the room opening can include a first room opening and the cable management enclosure further comprises a second room opening for routing wires between the enclosure and a second enclosure arranged in series.

As discussed herein, the enclosure can serve as a fixture of the building or home that remains with the property during a change in occupants. The wiring interconnects can provide a standard interface for installation of a different system by the second owner. The organization and professional installation of the enclosure can also provide for easier identification of the wiring assignments and ease of installation by the different occupant.

In some examples, installation and use of the enclosure allows the at least one first wire to be tested prior to the delivery and installation of the at least one electronic device. For instance, the one or more first wires can be connected to test equipment to verify the performance of the wiring and allowing for repair of damaged or incorrect wiring before installation of the one more electronic devices or the equipment rack. In another example, installation and use of the enclosure can speed up installation of the system by mitigating the occurrence wiring defects before installation is complete. Accordingly, the installation of the second wire and the electronic device can be simplified by reducing the labor involved in the validation and repair of wiring.

In further examples, installation and use of the enclosure can facilitate future changes to the configuration of the system. For example, in some instances additional wiring (a greater length of wiring than will be used) can be installed for future expansion. The additional wiring can be stored within the interior of the enclosure. Accordingly, an installer can easily locate and extend the wires to a later installed electronic device.

In various examples, the enclosure provides for the installation of entertainment or building control systems having one or more wires to a variety of rooms within a building or a home, for instance, systems including a large number of wires, such as between 10 and 200 first wires (e.g., in-wall wires). The enclosure can be used to provide a standardized fit and finish with little regard to installer experience. The installer can be provided with detailed engineering drawings showing where each wire is to be terminated, reducing installer interpretation or personal preference.

Figure 1:
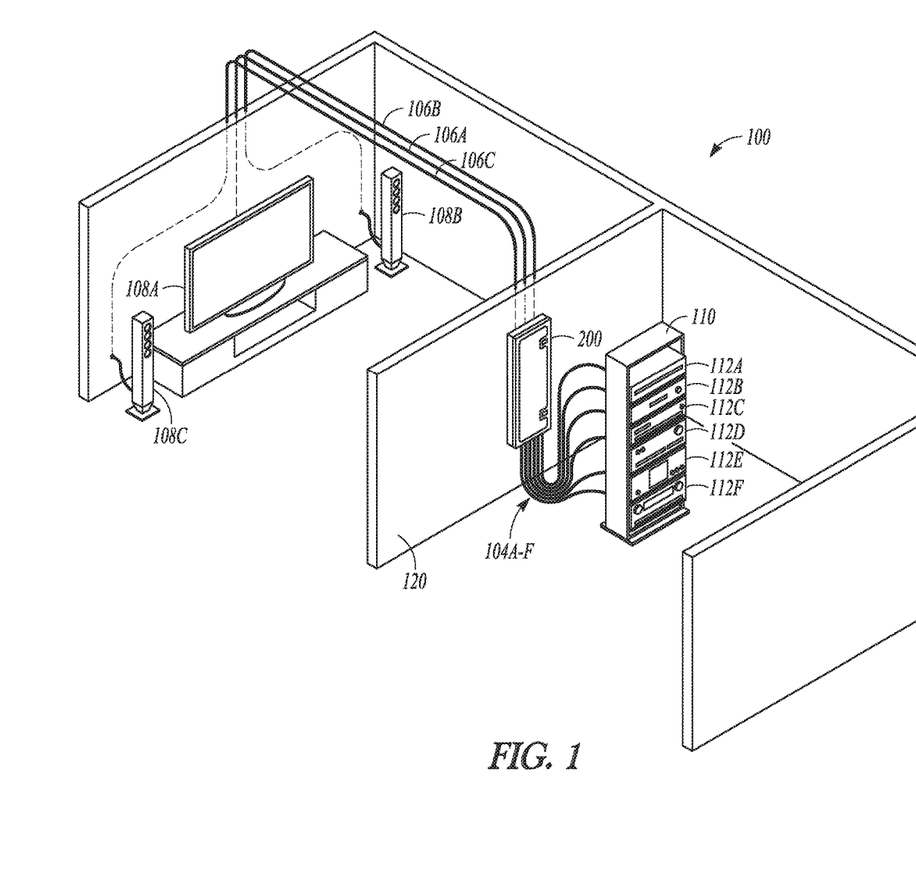
FIG. 1 illustrates an example of an audiovisual system, according to an embodiment.

FIG. 1 illustrates an example of a system 100 (e.g., an entertainment, building control or audiovisual (AV) system). The system 100 can include at least one electronic component, such as electronic component 108A-C. For instance, the electronic component can include, but is not limited to, audiovisual equipment, speakers, television, smart home device, router, or the like. The system can include at least one electronic device, such as electronic devices 112A-F. The electronic device can include, but is not limited to, audio receiver, cable receiver, satellite receiver, streaming media device, building controller (e.g., smart home device), router, DVD player, CD player, Blu-ray player, digital audio player, personal computer, or the like. In some examples, where the system 100 includes a plurality of electronic devices, the electronic devices can be supported on an equipment rack, such as equipment rack 110 (e.g., server or component rack). One or more electronic devices, such as electronic devices 112A-F, can be communicatively coupled to the electronic component through a cable management enclosure 200. For instance, the system 100 can include a first wire (e.g., first wires 106A-C) communicatively coupled between the one or more of the electronic components 108A-C. and a second wire (e.g., second wires 104A-F). In various examples, the system 100 can communicatively couple a variety of electronic components throughout one or more locations in a building or home. For instance, in an example, the building or home can include electronic components in a plurality of rooms. The first wire and second wire can be routed through one or more walls 120 of the building or home. As previously described, the cable management enclosure 200 can be configured to provide an organized and scalable wiring interface for communicatively coupling one or more electronic components with one or more electronic devices of the system 100.

Figure 2:
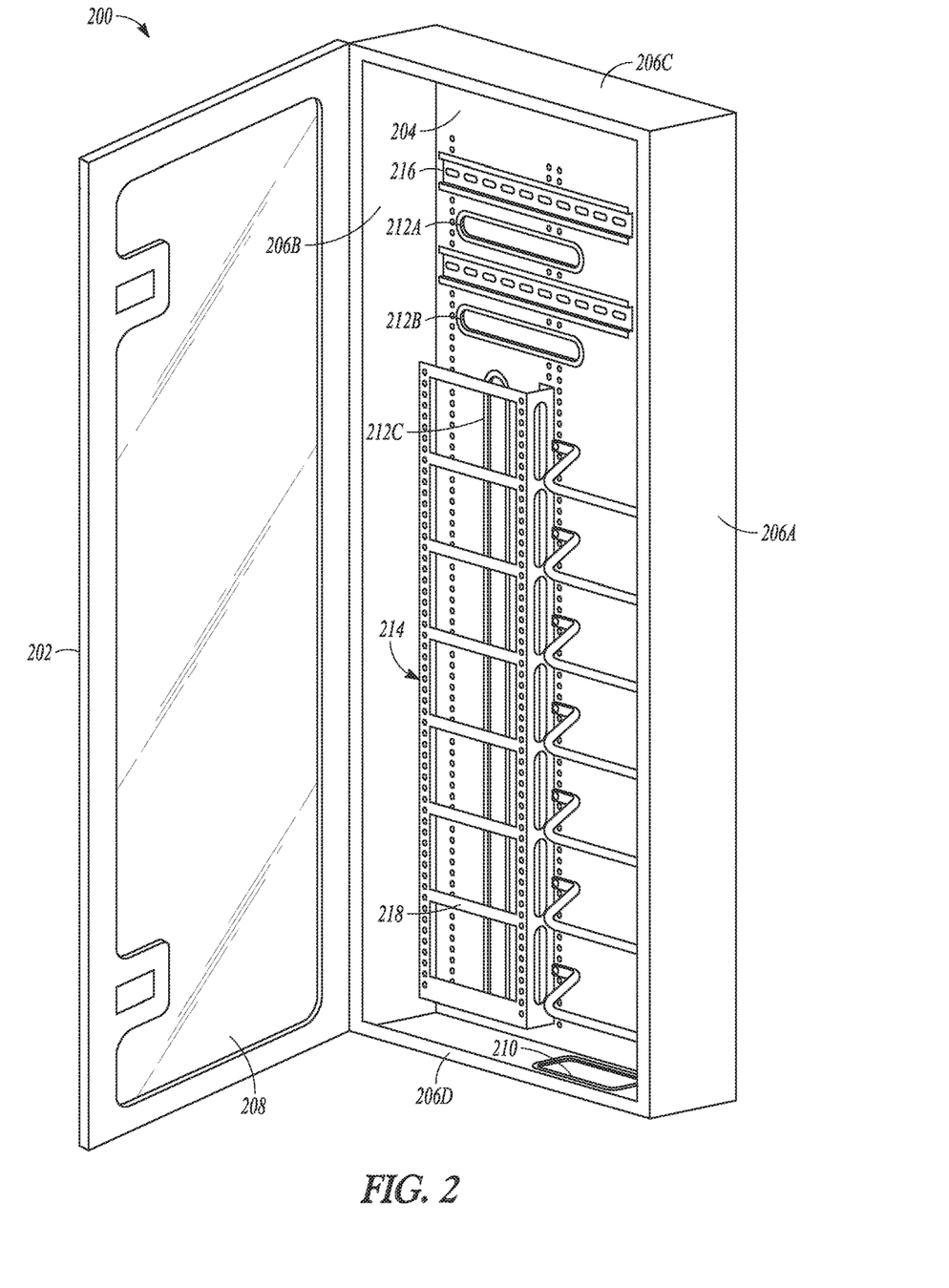
FIG. 2 is a perspective view of a cable management enclosure, according to an embodiment.

FIG. 2 is a perspective view of the cable management enclosure 200. The enclosure 200 can include a back panel 204, a plurality of side panels (e.g., a first side panel 206A, a second side panel 206B, a top panel 206C, and a bottom panel 206D), and a cover 202. The back panel 204, side panels, and cover 202 can define an interior of the enclosure 200. In the example of FIG. 2, the cover 202 includes a window 208 and is in an open configuration. In various examples, the back panel 204 can be configured to be wall mountable (e.g., wall facing in an installed configuration). When the enclosure is installed (e.g., mounted to the wall 120), the cover 202 and at least one of the side panels 206A-D can be room-facing. At least one wall opening, such as wall openings 212A-C, can be located on the back panel 204. The wall opening can be used to route one or more of the first wires (e.g., first wires 106A-C) from the exterior of the enclosure 200 to the interior of the enclosure. For instance, when the enclosure 200 is mounted on a wall 120, the one or more first wires can be routed from a wall cavity (e.g., stud cavity) of the wall 120 to the interior of the enclosure 200. A room opening 210 can be located on one or more of the side panels 206A-D or the cover 202. The room opening 210 can be used to route one or more second wires (e.g., second wires 104A-F) from the exterior of the enclosure 200 to the interior of the enclosure. For instance, the one or more second wires can be routed from one or more respective electronic devices (e.g., electronic devices 112A-F).

In an example, the enclosure 200 can include a plurality of room openings for communicatively coupling a third wire between a wiring interconnect of a first enclosure and a wiring interconnect of a second enclosure. For instance, a plurality of enclosures can be communicatively coupled in series or in parallel with wires. In other words, the first enclosure and the second enclosure can be communicatively coupled to expand the interconnecting capacity of the system.

The enclosure 200 can include a connector mounting bracket 214. For instance, the connector mounting bracket 214 can be coupled to the side panels 206A-D, or back panel 204. The connector mounting bracket 214 can support at least one wiring interconnect (shown in the example of FIG. 3 and described further herein) for coupling one or more first wires (e.g., wires 106A-C) to (one or more second wires 104A-F). In some examples, the connector mounting bracket 214 can be configured to include a mounting surface 218 that is separated at a distance from the back panel 204 to define a cable routing channel between the connector mounting bracket 214 and the back panel 204. In some examples, the connector mounting bracket 214 can provide separation of cables routed in from the wall opening from the cables routed in from the room opening. In some examples, the wiring interconnect can be coupled to the enclosure 200 by a mounting interface 216. In an example, the mounting interface 216 can include a Deutsches Institut für Normung (DIN) rail.

Figure 3:
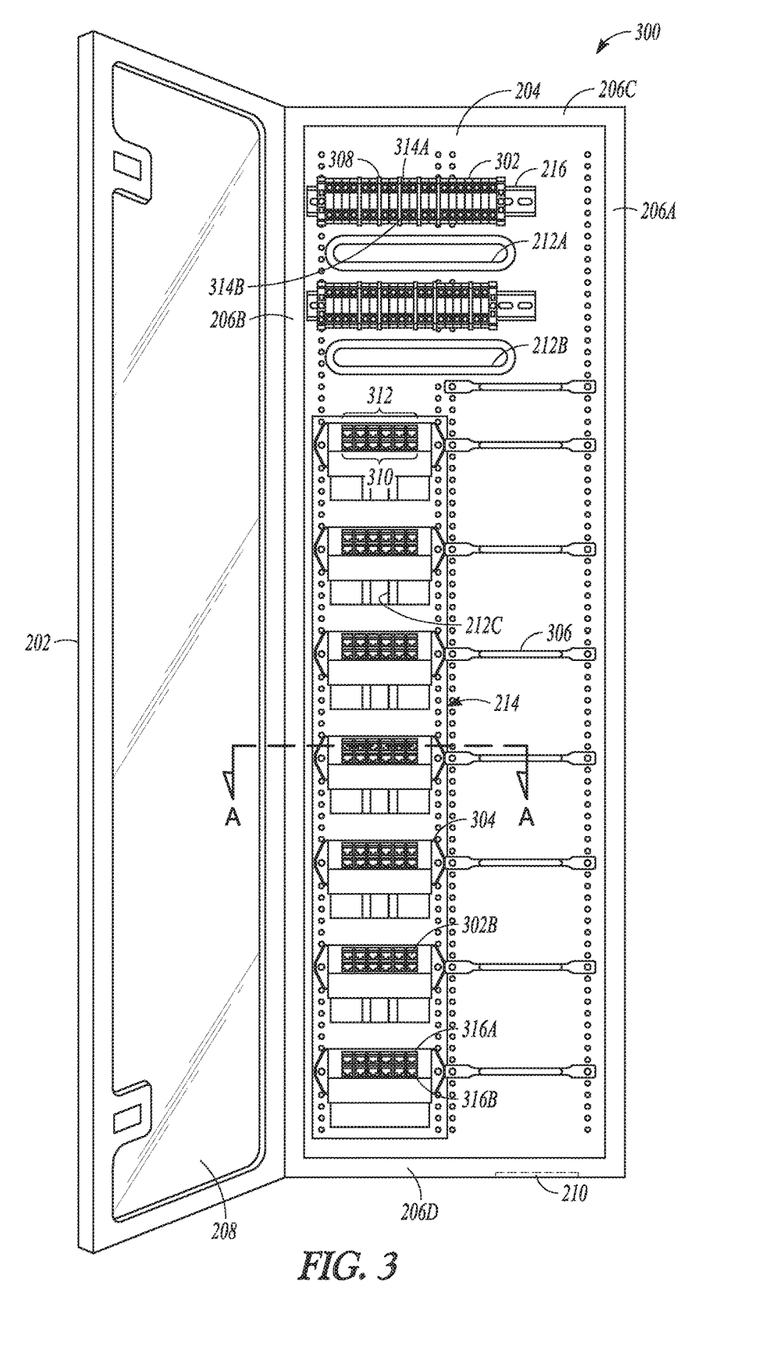
FIG. 3 illustrates a further example of a cable management enclosure including a plurality of wiring interconnects, according to an embodiment.

FIG. 3, illustrates a further example of a cable management enclosure 300 including a plurality of wiring interconnects, such as wiring interconnects 302A-B. The enclosure 300 can include the enclosure 200, as shown in the example of FIG. 2. For instance, the enclosure 300 can include the back panel 204, the plurality of side panels (e.g., a first side panel 206A, the second side panel 206B, the top panel 206C, the bottom panel 206D), the cover 202, one or more wall openings (e.g., wall openings 212A-C), the room opening 210, and the connector mounting bracket 214, as previously described herein. At least one wiring interconnect can be coupled to the enclosure 300. For instance, the wiring interconnect can be directly coupled to one or more of the back panel 204 or one of the side panels 206A-D. In an example, the wiring interconnect, such as wiring interconnect 302A can be coupled to a mounting interface 216, such as a bracket, rail, or DIN rail (as shown in the example of FIG. 2). In some examples, the wiring interconnect, such as wiring interconnect 302B can be coupled to the connector mounting bracket 214, as shown in FIG. 3.

The wiring interconnect can communicatively couple the first wire (e.g., at least one of the first wires 106A-C) to the second wire (e.g., at least one of the second wires 104A-F). In various examples, the wiring interconnect can include, but is not limited to, various electrical or optical plugs or jacks, such as a category (e.g., CAT 5, 6, or 7) cable connector (e.g., RJ45 connector), coaxial cable connector, HDMI connector, DisplayPort connector, IEEE-1394 (Firewire) connector, USB connector, audio jack (e.g., 3.5 mm or 2.5 mm), banana plug or socket, phono connector, cinch connector, Radio Corporation of America (RCA) connector. DIN connectors, speaker wire terminals (e.g., push terminals or binding post), barrier strip, or other electrical, optical, or audiovisual connector. In the example of FIG. 3, the wiring interconnect 302A can be a speaker wire terminal and the wiring interconnect 302B can be an RJ45 connector.

For instance, the wiring interconnect (e.g., wiring interconnect 302A) can include one or more connection terminals, such as a first connection terminal 314A and a second connection terminal 314B. In some examples, the connection terminal can include any electrically conductive terminal or optical fiber connection. The first connection terminal can be communicatively coupled to the second connection terminal, such as electrically coupled or optically coupled. The first wire can interface with the first connection terminal and the second wire can interface with the second connection terminal. Accordingly, the first wire can be communicatively coupled to the second wire and thus the electrical device can be communicatively coupled with the electrical component through the wiring interconnect in the enclosure 300. In an example, the wiring interconnect (e.g., wiring interconnect 302B) can include a first connector (e.g., connector 316A) and a second connector (e.g., connector 316B). The first connection terminal can be coupled in a housing of the first connector and the second connection terminal can be coupled within a housing of the second connector. In further examples, the first connector or the second connector can host a plurality of respective connection terminals for communicating with various conductors of the first wire and the second wire.

As shown in the example of FIG. 3, the enclosure 300 can include a connector block 304 coupled to the connector mounting bracket 214. The connector block 304 can support a plurality of wiring interconnects, such as wiring interconnects 302B as shown in the example of FIG. 3. For instance, the connector block 304 can include a plurality of locations for coupling a respective plurality of wiring interconnects. In some examples, the connector block 304 can support interchangeable keystone modules including the wiring interconnect 302B.

The plurality of wiring interconnects, such as wiring interconnects 302A-B, can be arranged in respective connector blocks 304 based on an association of wiring assignments. For example, the association of wiring assignments can include a room of a building or house, a category of electronic device (e.g., wires communicating with an audio receiver, television, smart home controller), or other logical grouping of wires. In a further example, a divider (such as divider 308) can separate one or more wiring interconnects, such as wiring interconnects of the connector block 304 corresponding to the association of wiring assignments. For instance, the divider 308 can separate the wiring interconnects assigned to a first room from the wiring interconnects assigned to a second or subsequent room.

One or more wires (e.g., one or more first wires 106A-C) can be routed within the cable routing channel (e.g., defined by the connector mounting bracket 214) and one or more second wires (e.g., 104A-F) can be routed between the room opening 210 and the respective wiring interconnect. The enclosure 300 can include at least one cable management ring 306 to route the at least one second wire between the wiring interconnect and the room opening 210. Accordingly, the clutter of wires can be reduced within the interior of the enclosure 300 by restraining the first wires within the cable routing channel behind the wiring interconnects (e.g., wiring interconnect 302B) and providing easier access to the wiring interconnects for the installation of corresponding second wires.

As shown in the examples of FIGS. 2-3, the enclosure 300 can include a plurality of wall openings, such as wall openings 112A-C. Optionally, the number of wall openings can correspond to the number of wiring interconnects, the number of connector blocks 304, or the number of connector mounting interfaces 216 (e.g., din rail). As shown in the example of FIG. 3, the wall opening, such as wall opening 212A can be located proximate to one of the wiring interconnects, such as wiring interconnect 302A (e.g., within 6 inches or less of the wiring interconnect). The wall opening, such as wall opening 212A-C can be elongate to span the number of wiring interconnects or connector blocks. In a further example, the wall opening (e.g., wall opening 212C) can be located along the cable routing channel. For instance, the wall opening can provide a passage for routing the first wires directly into the cable routing channel as shown in FIG. 3. For instance, the wall opening 212C can be elongate in the vertical direction and can extend along all or a portion of the connector mounting bracket 214. Accordingly, the wall openings can be arranged to conceal the routing of the first wires form the wall cavity to the interior of the cabinet, and the wall openings can be configured to provide organization to the arrangement and reduce clutter of the first wires within the enclosure 300.

In some examples, the connector block 304 includes a front row 310 and a back row 312 of wiring interconnects, such as wiring interconnects 302B. For instance, the front row 310 can be configured for coupling with the second wire. The back row 312 can be configured for coupling with the first wire, where the first wire is routed from the wall opening 212C and through the cable routing channel. The plurality of wall openings 212A-C and the cable routing channel can facilitate organization of the wires within the interior of the enclosure 300. For instance, the cables can be separated based on where they are routed within the enclosure 300 (e.g., different connector blocks 304, the front row 310, or the back row 312).

Figure 4:
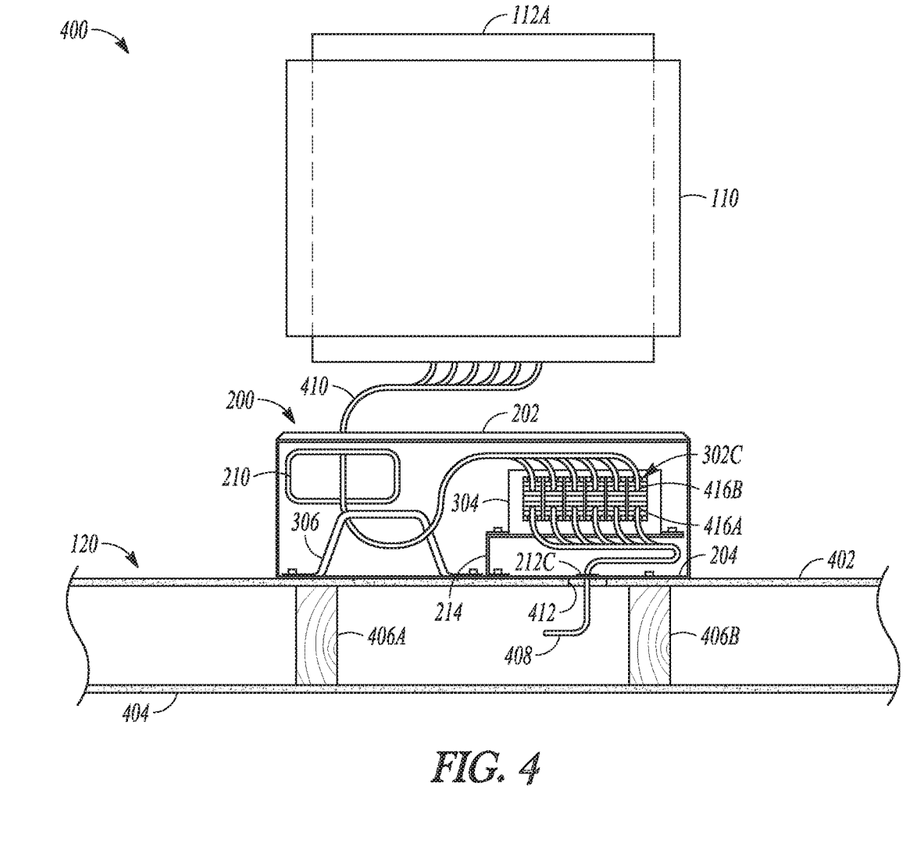
FIG. 4 depicts a cross section of an example of a cable management enclosure in an installed configuration, according to an embodiment.
Figure 5:
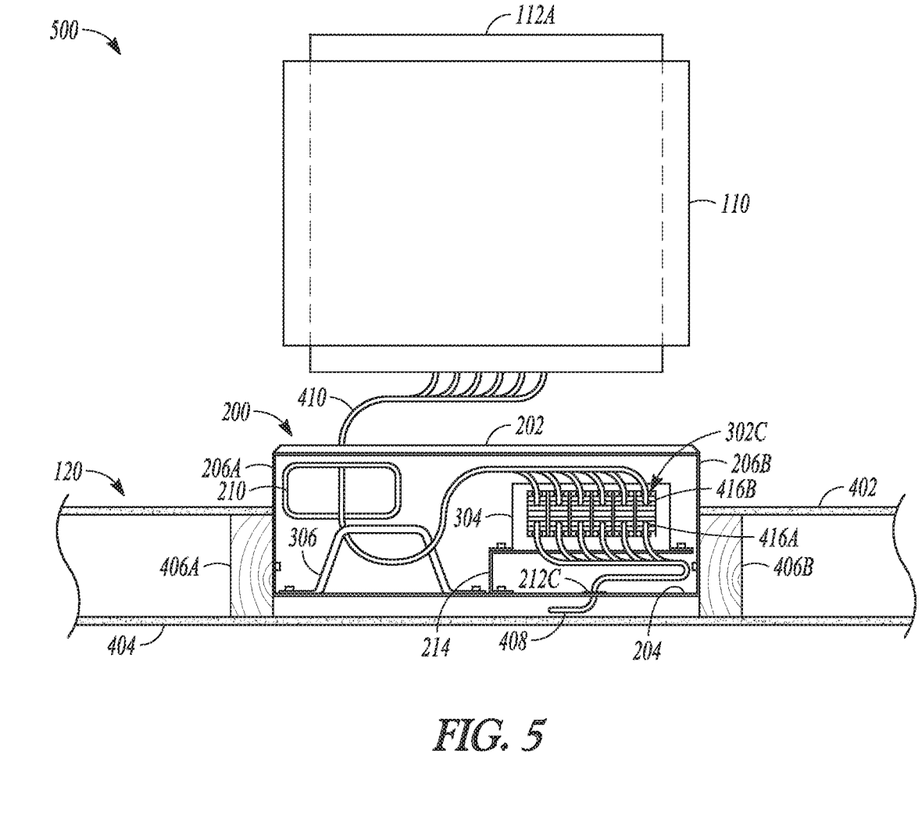
FIG. 5 depicts a cross section of a further example of a cable management enclosure in an installed configuration, according to an embodiment.

FIG. 4 depicts a cross section of an example of a cable management enclosure 400 in an installed configuration. The cross section can be located at section A-A shown in FIG. 3. For instance, the cross section can be a view from the top of the enclosure 300. The cable management enclosure 400 can include the enclosure 200 or the enclosure 300 as previously shown and described herein. The enclosure 400 can be mounted to a wall, such as wall 120, shown in the example of FIG. 1. The wall 120 can include a plurality of studs (such as stud 406A and stud 406B), a first wall surface 402, and a second wall surface 404. The enclosure 400 can be coupled to the first wall surface 402. The first wall surface 402 can be located on one side of the studs 406A. B, and the second wall surface 404 can be located on an opposing side of the studs 406A. B. In the example of FIG. 4, the back panel 204 is mounted to the first wall surface 402. Optionally, the back panel 204 is mounted to one or more studs (e.g., studs 406A. B) through the first wall surface 402. For instance, the back panel 204 can include one or more apertures and can be mounted to the wall 120 using one or more fasteners, such as screws, bolts, nails, or the like inserted through the one or more apertures. In the example of FIG. 4, the enclosure can include a width greater than the spacing between the first studs 406A and the second stud 406B. Accordingly, the enclosure 400 can include a variety of sizes As shown in FIGS. 4 and 5, a first wire 408 can be routed from a stud cavity defined by a volume located between the first wall surface 402, the second wall surface 404, the first stud 406A, and the second stud 406B. From the stud cavity, the first wire 408 can be routed into the interior of the enclosure 400 through an opening 412 within the first wall surface 402 and the wall opening (e.g., wall opening 212C) in the back panel 204. On the interior of the enclosure 400, the first wire 408 can be routed through the cable routing channel and communicatively coupled to the first connection terminal (e.g., connection terminal 416A) of the wiring interconnect 302C. The second wire 410 can be communicatively coupled to the first wire 408 through a second terminal (e.g., connection terminal 416B) of the wiring interconnect 302C. From the wiring interconnect 302C, the second wire 410 can be routed through the cable management ring 306 and through the room opening 210. The second wire 410 can be routed from the room opening 210 to the electronic device (such as one of electronic devices 112A-F as shown in the example of FIG. 1). Accordingly, through the enclosure 400, the electronic device can be communicatively coupled to one or more electronic components located in the building or home. The enclosure 400 can provide organization where there are a plurality of first and second wires, for example, a large number of wires routed from a plurality of electronic devices communicatively coupled to a variety of electronic components located throughout the building or home. For instance, the plurality of electronic devices can be stored in an equipment rack 110, as shown in the examples of FIGS. 1, 4, and 5. In a further example, the enclosure 400 can provide a professional appearance to the installation. For instance, where the first wire 408 or second wire 410 include unused length or there are unused wires for future expansion of the system (e.g., system 100), the enclosure 400 can provide space for storing the unused wiring in an organized manner.

FIG. 5 depicts a cross section of a further example of a cable management enclosure 500 in an installed configuration. Similar to FIG. 4, the cross section can be located at section A-A as shown in FIG. 3. The cable management enclosure 500 can include the enclosure 200, 300, or 400 as previously shown and described herein. In the example of FIG. 5, the enclosure 500 can be mounted within or partially within the stud cavity. For instance, the back panel 204 can be positioned within the stud cavity, such as between the first wall surface 402, second wall surface 404, first stud 406A, and second stud 406B. In some examples, the first side panel 206A or second side panel 206B can be coupled (e.g., fastened) to the wall, such as the first stud 406A or the second stud 406B. Accordingly, the enclosure 500 can be partially concealed within the wall, such as wall 120 to reduce the space used or provide a smaller appearance.

Figure 6:
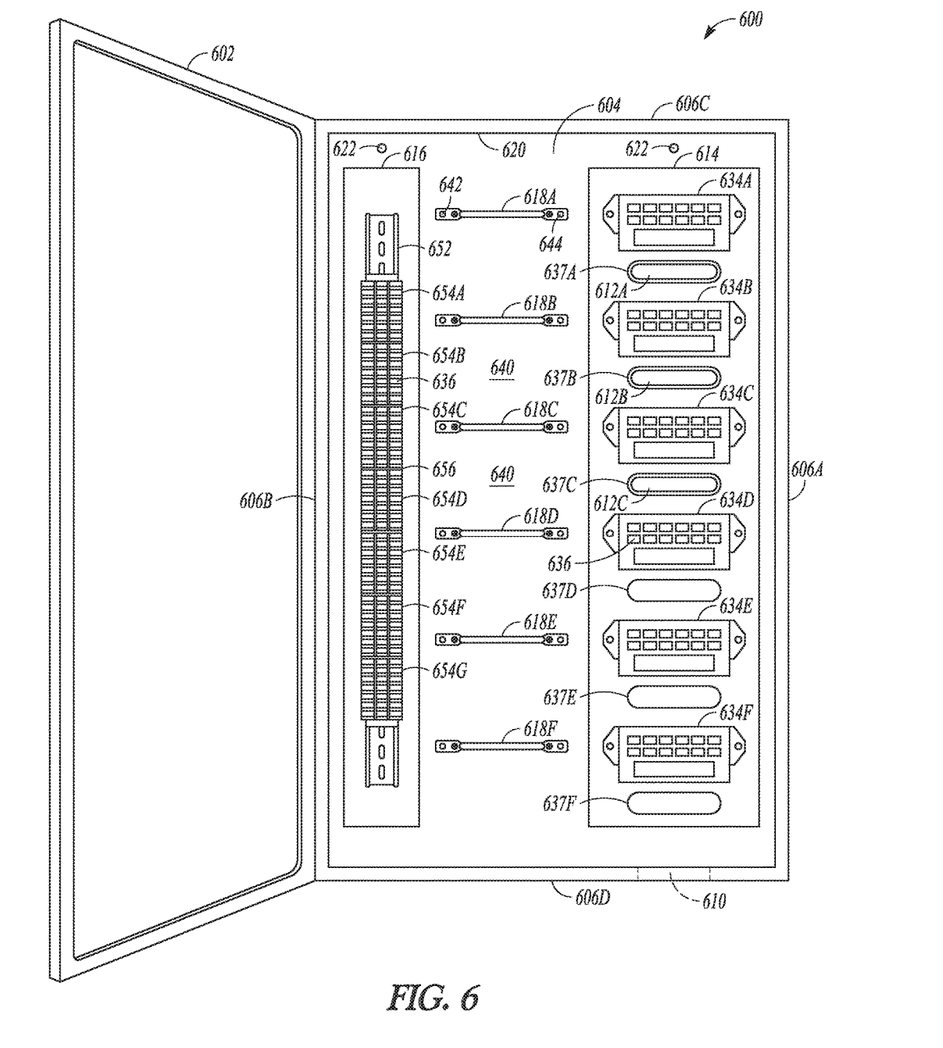
FIG. 6 is a plan front view of a cable management enclosure, according to an embodiment.
Figure 7:
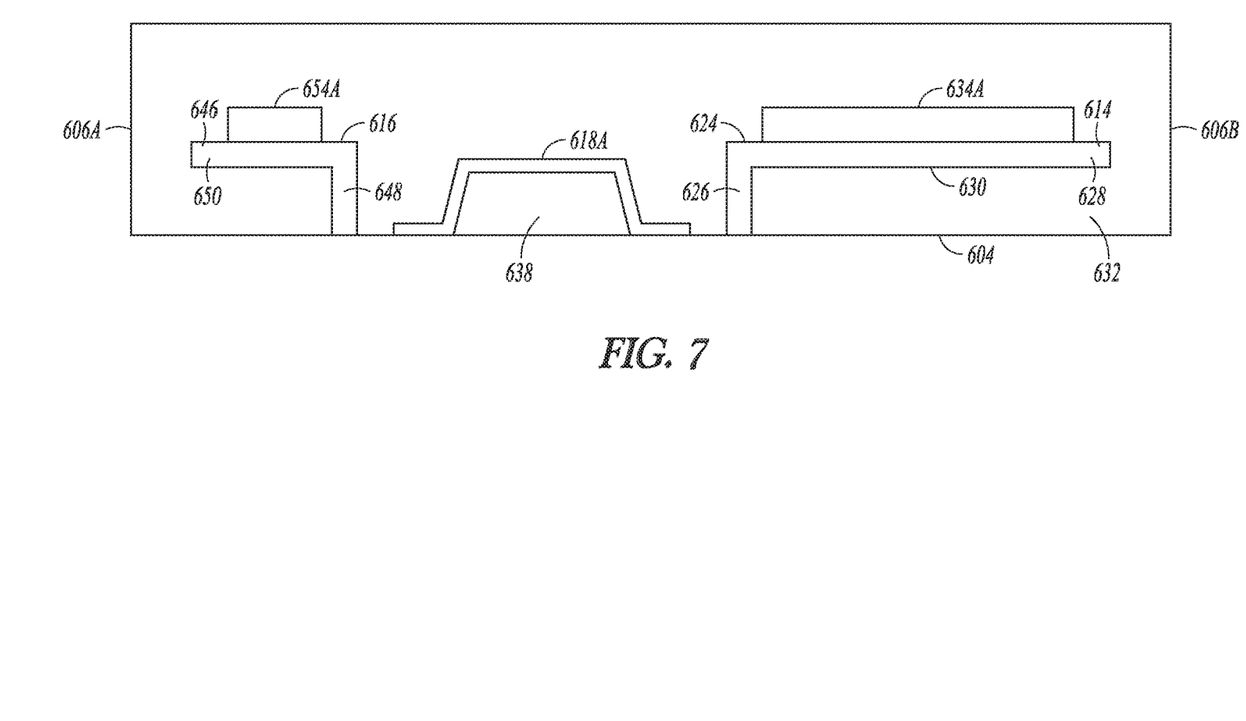
FIG. 7 is a cut-away top plan view of a cable management enclosure, according to an embodiment.

FIGS. 6-7 illustrate an exemplary example of a cable management enclosure 600. The enclosure 600 can include a cover 602, back panel 604, plurality of side panels (e.g. first side panel 606A, second side panel 606B, the top panel 606C, the bottom panel 606D), a room opening 610, one or more wall openings (e.g., wall openings 612A-C), a first connector mounting bracket 614, a second connector mounting bracket 616, and a plurality of cable management rings (e.g. cable management rings 618A-F).

The cover 602 in an example is coupled to a side panel 606A, 606B to allow access to the interior 620 of the enclosure 600. The back panel 604 and side panels 606A-D can include apertures 622 for mounting the enclosure 600 on or within a wall. While illustrated as apertures 622 for fasteners, other mounting apparatus may be utilized.

The first connector mounting bracket 614 in one example includes a support arm 624 that in one embodiment is generally L-shaped. The support arm 624 includes a first coupling section 626 for coupling to the back panel 604 and a first mounting section 628 extending from the first coupling section 626 in parallel spaced relation to the back panel 604 to define first channel 630 for receiving wiring (not shown). The first mounting section 628 terminates leaving a gap 632 between the first mounting section 628 and back panel 604 to accommodate wire movement and bundling.

A plurality of first connector blocks 634A-F are coupled, and in one example mounted, on the first mounting section 628 of the first connector mounting bracket 614. The first connector blocks 634A-F can each include a plurality of wiring interconnects 636. In some examples, a first connector block 634A-F can support interchangeable keystone modules. In another example the plurality of wiring interconnects 636 can be arranged in a respective first connector block 634A-F based on an association of wiring assignments as described in previous examples. In one example, the first connector block 634A-F is a DIN rail, while in another example is a twelve (12) port panel.

The first connector mounting bracket 614 in an example also includes a plurality of bracket openings 637A-F each located below a respective first connector block 634A-F. In this manner, wiring routed through the defined first channel 630 is routed through the desired opening 637A-F to facilitate coupling to the wiring interconnects 636.

The plurality of cable management rings 618A-F in one example are aligned to define a passageway 638 within the interior 620 of the enclosure. In the example, each ring 618A-F extends generally parallel to the top panel 606C and bottom panel 606D in spaced relation to one another such that each ring 618A-F forms an individual horizontal plane. In this manner the defined passageway 638 includes openings 640 or spacing between each ring 618A-F to allow receipt of wiring from any position on the first and second connector mounting brackets 614 and 616. Thus, wiring is easily feed from wiring interconnects 636 on either the first or second connector mounting bracket 614, 616 through the openings 640 between the rings 618A-F and into the passageway 638. In an example, a first wire is routed through the back panel 604 into the first channel 630, disposed through a bracket opening 637A-F and coupled into a wiring interconnect 636 of a first connector block 634A-F. A second wire can then be coupled into another wiring interconnect 636 of the first connector block 634A-F and routed through an opening 640 into the passageway 638 and to a room opening 610 for use.

In an example, the cable management rings 618A-F extend from a first end 642 adjacent the first connector mounting bracket 614 to a second end 644 adjacent the second connector mounting bracket 616. By being positioned between the first and second connector mounting brackets 614, 616, wiring coupled in the wiring interconnects 636 of both mounting brackets 614, 616 are conveniently located for placement into the passageway 638. Specifically, in an example, each cable management ring 618A-F is placed such that the horizontal plane of each cable management ring intersects a wiring interconnect 636 of a first connector block 634A-F and a wiring interconnect 636 of a second connector block 654A-F. By being placed in such close proximity to both a first connector block 654A-F and a second connector block, routing of wiring is simplified.

The second mounting interconnect bracket 616 in an example includes a second support arm 646 that in one embodiment is generally L-shaped. The second support arm 646 includes a second coupling section 648 for coupling to the back panel 604 and a second mounting section 650 extending from the first coupling section 626 in parallel spaced relation to the back panel 604. In one example, the second mounting section 650 includes a rail 652 for receiving a plurality of second connector blocks 654A-G.

The plurality of second connector blocks 654A-G in one example are the same type of connector blocks as the first connector blocks 634A-F. In another example, the second connector blocks 654A-G are different than the type of connector blocks as the first connector blocks 634A-F. In an example, the second connector block is a DIN rail, while in another example is a twelve (12) port panel. In another example, the second connector blocks 654A-G include a plurality of dividers 656 to allow organization of the wiring from certain areas of a dwelling, or from similar types of electronic equipment.

The second connector blocks 654A-G can each include a plurality of wiring interconnects 636 similar to the first connector blocks 634A-F. Such wiring interconnects 636 can be a similar type or different type of wiring interconnect compared to the wiring interconnects 636 of first connector blocks 634A-F. In some examples, a second connector block 654A-G can support interchangeable keystone modules. In another example the plurality of wiring interconnects 636, can be arranged in a respective second connector block 654A-G based on an association of wiring assignments as described in previous examples.

By disposing the plurality of engagement rings 618 between the first connector mounting bracket 614 and second connector mounting bracket 616 in side-by-side relation, the width of the enclosure is increased compared to the other embodiments. In this manner, the enclosure has a reduced height allowing for more flexibility in enclosure placement. Additionally, with the reduced height, enclosures may be stacked on one another with the interior of the top enclosure still accessible to a standing individual to install or test the wiring.

Additionally, by centrally locating the engagement rings 618 between the first connector mounting bracket 614 and second connector mounting bracket 616, wiring feed into the plurality of engagement rings 618 is evenly split and more accessible. This presents both improved maneuverability and utility.

Figure 8:
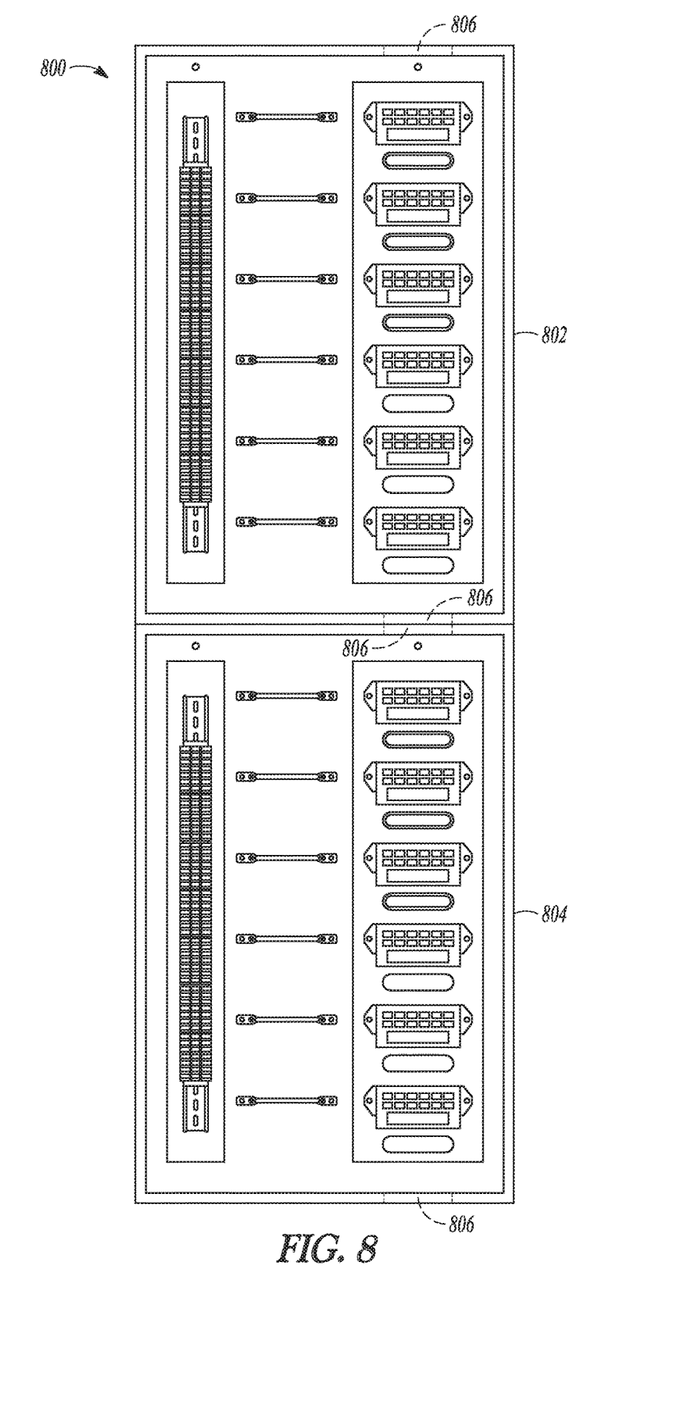
FIG. 8 is a perspective view of a cable management system.

FIG. 8 illustrates an example cable management system 800 with first and second cable management enclosures 802, 804 stacked on top of one another. In an example embodiment the each enclosure 802, 804 is an enclosure as described in regard to FIGS. 1-5. In another example, each enclosure 802, 804 is an enclosure as described in regard to FIGS. 6-7. In yet another example, one enclosure 802 or 804 is an enclosure as described in regard to FIGS. 1-5 while the other enclosure 802 or 804 is an enclosure as described in regard to FIGS. 6-7.

Each enclosure includes a room opening 806 on a panel that aligns with the room opening of the other panel. In the illustrated example the room opening of the top enclosure 802 is located in the bottom panel and a room opening of the bottom enclosure 804 is located in the top panel, such that the openings align and a pathway between the first enclosure 802 and second enclosure 804 is provided such that wiring can be passed from the interior of the first enclosure 802 to the interior of the second enclosure 804. While the room openings are shown as presented in corresponding bottom and top panels, the room openings may be on any panels to form a pathway between the first and second enclosures 802, 804. In this manner, the enclosures are modular, allowing the stacking or combination of a plurality of enclosures to provide additional capacity of receiving wiring.

VARIOUS NOTES & EXAMPLES

Each of these non-limiting examples may stand on its own, or may be combined in various permutations or combinations with one or more of the other examples. To better illustrate the method and apparatuses disclosed herein, a non-limiting list of embodiments is provided here:

Example 1 is a cable management enclosure for organizing wires, the cable management enclosure comprising: a wall-mountable enclosure including a front cover, a back panel, and a plurality of side panels; a wall opening located on the back panel of the enclosure, the wall opening for routing wire between an interior of the enclosure and an exterior of the enclosure; a first connector mounting bracket coupled to the back panel and coupled to a first wiring interconnect; a second connector mounting bracket coupled to the back panel and coupled to a second wiring interconnect; and a cable management ring extending between the first connector mounting bracket and second connector mounting bracket to receive a first wire coupled to the first wiring interconnect and a second wire coupled to the second wiring interconnect.

In Example 2, the subject matter of Example 1 optionally includes wherein the first connector mounting bracket is located between the back panel and the front cover to define a cable routing channel between the back panel and the connector mounting bracket.

In Example 3, the subject matter of any one or more of Examples 1-2 optionally include a room opening located on at least one of the plurality of side panels, the room opening for routing wire between the interior of the enclosure and the exterior of the enclosure.

In Example 4, the subject matter of any one or more of Examples 1-3 optionally include wherein the connector mounting bracket separates the first wiring interconnect from the back panel.

In Example 5, the subject matter of any one or more of Examples 1-4 optionally include a plurality of wall openings located on the back panel and along a portion of the cable routing channel.

In Example 6, the subject matter of any one or more of Examples 1-5 optionally include wherein the room opening includes a first room opening and the cable management enclosure further comprises a second room opening for routing wires between the enclosure and a second enclosure arranged in series.

In Example 7, the subject matter of any one or more of Examples 1-6 optionally include wherein the cable management ring defines a horizontal plane and the horizontal plane intersects the first wiring interconnect and the second wiring interconnect.

In Example 8, the subject matter of any one or more of Examples 1-7 optionally include wherein the at least one of the first wiring interconnect or the second wiring interconnect includes at least one keystone module.

In Example 9, the subject matter of any one or more of Examples 1-8 optionally include wherein the first wiring interconnect is within a first connector block and the second wiring interconnect is within a second connector block.

In Example 10, the subject matter of any one or more of Examples 1-9 optionally include wherein the first connector block includes a front row of wiring interconnects and a back row of wiring interconnects.

In Example 11, the subject matter of any one or more of Examples 1-10 optionally include wherein the at least one of the first wiring interconnect or the second wiring interconnect includes a jack to receive a plug located at the end of the first wire or second wire.

In Example 12, the subject matter of any one or more of Examples 1-11 optionally include a divider separating at least one of the first wiring interconnect or the second wiring interconnect corresponding to an association of wiring assignments.

In Example 13, the subject matter of any one or more of Examples 1-12 optionally include wherein the first connector mounting bracket receives a first panel that is a Deutsches Institut für Normung (DIN) rail.

In Example 14, the subject matter of Example 13 optionally includes wherein the second connector mounting bracket receives a second panel that is a twelve-port panel.

In Example 15, the subject matter of any one or more of Examples 1-14 optionally include wherein at least one of the plurality of side panels is room-facing.

Example 16 is a cable management enclosure for organizing wires, the cable management enclosure comprising: a wall-mountable enclosure including a front cover, a back panel, and a plurality of side panels; a wall opening located on the back panel of the enclosure, the wall opening for routing wire between an interior of the enclosure and an exterior of the enclosure; a first connector mounting bracket coupled to the back panel receiving a first connector block at a first mounting section that is spaced from the back panel to define a cable routing channel between the back panel and the mounting section; a second connector mounting bracket coupled to the back panel and coupled to a second connector block; and a series of aligned cable management rings coupled to the back panel between the first connector mounting bracket and second connector mounting bracket to define a pathway for wiring through the interior of the enclosure to a room opening located on at least one of the plurality of side panels.

In Example 17, the subject matter of Example 16 optionally includes wherein the first connector mounting bracket is on an opposite side of the series of aligned cable management rings than the second connector mounting bracket.

In Example 18, the subject matter of any one or more of Examples 16-17 optionally include wherein at least one of the series of aligned cable management rings extends from a first end adjacent the first connector mounting bracket to a second end adjacent the second connector mounting bracket.

In Example 19, the subject matter of any one or more of Examples 16-18 optionally include wherein the first connector mounting bracket is DIN rail.

In Example 20, the subject matter of Example 19 optionally includes wherein the second connector mounting bracket is a twelve port panel.

In Example 21, the subject matter of any one or more of Examples 16-20 optionally include wherein the wall-mountable enclosure is a first wall mountable enclosure, and further comprising: a second wall-mountable enclosure coupled to the first wall-mounted enclosure and including a front cover, a back panel, and a plurality of side panels wherein the second wall-mountable enclosure has enclosure opening to receive wiring from the first wall-mountable enclosure.

In Example 22, the subject matter of any one or more of Examples 16-21 optionally include wherein the second connector mounting bracket includes a second mounting section that is spaced from the back panel to align with the first mounting section.

Example 23 is a system including a cable management enclosure for mounting to a wall, the system comprising: an electronic component; a first wire communicatively coupled to the electronic component; a cable management enclosure including: a wall-mountable enclosure including a front cover, a back panel, and a plurality of side panels, wherein the back panel is wall-facing when in a mounted configuration; a wall opening located on the back panel of the enclosure, the wall opening to route at least one first wire between an interior of the enclosure and an exterior of the enclosure; a room opening located on at least one of the plurality of side panels, the room opening to route at least one second wire between an interior of the enclosure and an exterior of the enclosure; a connector mounting bracket coupled to the back panel and located between the back panel and the front cover, wherein a cable routing channel is defined between the back panel and the connector mounting bracket, and wherein the connector mounting bracket is configured to support at least one wiring interconnect to host respective connection terminals for the at least one first wire; and an electronic device communicatively coupled to the second wire.

In Example 24, the subject matter of Example 23 optionally includes wherein the electronic device is communicatively coupled to the electronic component through the second wire, the wiring interconnect, and the first wire.

In Example 25, the subject matter of any one or more of Examples 23-24 optionally include wherein the first wire is routed through a stud cavity in the wall and through the wall opening on the back panel.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. Further, examples may utilize any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) may be used in combination with each other. Other embodiments can be used, such as by one of ordinary skill in the art upon reviewing the above description. The following claims are hereby incorporated into the Detailed Description as examples or embodiments, with each claim standing on its own as a separate embodiment, and it is contemplated that such embodiments can be combined with each other in various combinations or permutations.

What is claimed is:

1. A cable management enclosure for organizing wires, the cable management enclosure comprising:
   a wall-mountable enclosure including a front cover, a back panel, and a plurality of side panels;
   a wall opening located on the back panel, the wall opening for routing wire between an interior of the wall-mountable enclosure and an exterior of the wall-mountable enclosure;
   a first connector mounting bracket coupled to the back panel and coupled to a first wiring interconnect;
   a second connector mounting bracket coupled to the back panel and coupled to a second wiring interconnect; and
   a cable management ring located between the first connector mounting bracket and the second connector mounting bracket and configured to receive a first wire coupled to the first wiring interconnect and a second wire coupled to the second wiring interconnect, wherein the cable management ring is coupled to the back panel of the wall-mountable enclosure.

2. The cable management enclosure of claim 1, wherein the first connector mounting bracket is located between the back panel and the front cover to define a cable routing channel located between the back panel and a first side of the first connector mounting bracket.

3. The cable management enclosure of claim 2, further comprising a bracket opening defined by the first connector mounting bracket, wherein the bracket opening allows routing wire between the cable routing channel and a second side of the first connector mounting bracket.

4. The cable management enclosure of claim 1, further comprising:
   a first room opening located on at least one of the plurality of side panels, the first room opening for routing wire between the interior of the wall-mountable enclosure and the exterior of the wall-mountable enclosure, and
   a second room opening located on at least one of the plurality of side panels, the second room opening for routing wires between the wall-mountable enclosure and a second wall-mountable enclosure.

5. The cable management enclosure of claim 1, wherein the first connector mounting bracket separates the first wiring interconnect from the back panel.

6. The cable management enclosure of claim 1, wherein the cable management ring defines a horizontal plane and the horizontal plane intersects the first wiring interconnect and the second wiring interconnect.

7. The cable management enclosure of claim 1, wherein the at least one of the first wiring interconnect or the second wiring interconnect includes at least one keystone module.

8. The cable management enclosure of claim 1, wherein the first wiring interconnect is within a first connector block and the second wiring interconnect is within a second connector block and the first connector block includes a front row of wiring interconnects and a back row of wiring interconnects.

9. The cable management enclosure of claim 1, wherein the at least one of the first wiring interconnect or the second wiring interconnect includes a jack to receive a plug located at an end of the first wire or second wire.

10. The cable management enclosure of claim 1, wherein the first connector mounting bracket receives a first panel that is a Deutsches Institut für Normung (DIN) rail and the second connector mounting bracket receives a second panel that is a twelve-port panel.

11. The cable management enclosure of claim 1, wherein the first connector mounting bracket is spaced apart from the second connector mounting bracket by a bracket gap, and the cable management ring is coupled to a portion of the back panel located in the bracket gap.

12. A cable management enclosure for organizing wires, the cable management enclosure comprising:

a wall-mountable enclosure including a front cover, a back panel, and a plurality of side panels;

a wall opening located on the back panel of the wall-mountable enclosure, the wall opening for routing wire between an interior of the wall-mountable enclosure and an exterior of the wall-mountable enclosure;

a first connector mounting bracket coupled to the back panel receiving a first connector block at a first mounting section that is spaced from the back panel to define a cable routing channel between the back panel and the first mounting section;

a second connector mounting bracket coupled to the back panel and coupled to a second connector black;

a bracket opening defined by the first connector mounting bracket, wherein the bracket opening allows routing wire between the cable routing channel and a second side of the first connector mounting bracket; and a series of aligned cable management rings coupled to the back panel between the first connector mounting bracket and second connector mounting bracket to define a pathway for wiring through the interior of the wall-mountable enclosure to a room opening located on at least one of the plurality of side panels.

13. The cable management enclosure of claim 12, wherein the first connector mounting bracket is on an opposite side of the series of aligned cable management rings than the second connector mounting bracket.

14. The cable management enclosure of claim 12, wherein at least one of the series of aligned cable management rings extends from a first end adjacent the first connector mounting bracket to a second end adjacent the second connector mounting bracket.

15. The cable management enclosure of claim 12, wherein the first connector mounting bracket is DIN rail and the second connector mounting bracket, is a twelve port panel.

16. The cable management enclosure of claim 12, wherein the wall-mountable enclosure is a first wall-mountable enclosure, and further comprising:

a second wall-mountable enclosure coupled to the first wall-mounted enclosure and including a front cover, a back panel, and a plurality of side panels wherein the second wall-mountable enclosure has enclosure opening to receive wiring from the first wall-mountable enclosure.

17. The cable management enclosure of claim 12, wherein the second connector mounting bracket includes a second mounting section that is spaced from the back panel to align with the first mounting section.

18. A system including a cable management enclosure for mounting to a wall, the system comprising:

an electronic component;

a first wire communicatively coupled to the electronic component;

a cable management enclosure including:

a wall-mountable enclosure including a front cover, a back panel, and a plurality of side panels, wherein the back panel is wall-facing when in a mounted configuration;

a wall opening located on the back panel of the wall-mountable enclosure, the wall opening to route the first wire between an interior of the wall-mountable enclosure and an exterior of the wall-mountable enclosure;

a room opening located on at least one of the plurality of side panels, the room opening to route a second wire between an interior of the wall mountable enclosure and an exterior of the wall-mountable enclosure;

a connector mounting bracket coupled to the back panel and located between the back panel and the front cover, wherein a cable routing channel is defined between the back panel and the connector mounting bracket, and wherein the connector mounting bracket is configured to support a wiring interconnect for the first wire;

a bracket opening defined by the connector mounting bracket, wherein the bracket opening allows routing wire between the cable routing channel and a second side of the first connector mounting bracket; and an electronic device communicatively coupled to the second wire.

19. The system of claim 18, wherein the electronic device is coupled to the electronic component through the second wire, the wiring interconnect, and the first wire.

20. The system of claim 18, wherein the first wire is routed through a stud cavity in the wall and through the wall opening on the back panel.

* * * * *